United States Patent
Eliaz et al.

(10) Patent No.: US 7,596,183 B2
(45) Date of Patent: Sep. 29, 2009

(54) JOINT OPTIMIZATION OF TRANSMITTER AND RECEIVER PULSE-SHAPING FILTERS

(75) Inventors: Amir Eliaz, Moshav Ben-Shemen (IL); Eran Ridel, Rosh Ha'ayin (IL)

(73) Assignee: Provigent Ltd., Herzliya (IL)

(*) Notice: Subject to any disclaimer, the term of this patent is extended or adjusted under 35 U.S.C. 154(b) by 653 days.

(21) Appl. No.: 11/394,338

(22) Filed: Mar. 29, 2006

(65) Prior Publication Data

US 2007/0230593 A1  Oct. 4, 2007

(51) Int. Cl.
*H04B 15/00* (2006.01)
*H04B 1/10* (2006.01)

(52) U.S. Cl. .......................... 375/285; 375/350
(58) Field of Classification Search ................ 375/285, 375/260, 350, 346, 232; 708/322, 323; 333/28 R, 333/138, 144

See application file for complete search history.

(56) References Cited

U.S. PATENT DOCUMENTS

| | | | | |
|---|---|---|---|---|
| 7,218,672 | B2* | 5/2007 | Birru | 375/233 |
| 2002/0136288 | A1* | 9/2002 | McCarty, Jr. | 375/232 |
| 2002/0150184 | A1* | 10/2002 | Hafeez et al. | 375/346 |
| 2004/0228399 | A1* | 11/2004 | Fimoff et al. | 375/233 |
| 2005/0025230 | A1* | 2/2005 | Hillery | 375/233 |

OTHER PUBLICATIONS

Zeng, "Pulse shaping filter design and interference analysis in UWB communication systems" PhD Thesis submitted to the Virginia Polytechnic Institute and State University, Falls Church, Virginia, Jul. 20, 2005, Chapter 4, pp. 62-80.

Mir and Roy, "Optimum transmitter/receiver design for a narrowband overlay in noncoordinated subsciber lines" IEEE Transactions on Communications, (52:6), Jun. 2004, pp. 992-998.

Ho Cho, "Joint transmitter and receiver optimization in additive cyclostationary noise", IEEE Transactions on Information Theory, (50:12), Dec. 2004, pp. 3396-3405.

Jung and Wunder, "The WSSUS pulse design problem in multicarrier transmission", e-print in ar Xiv.org operated by Cornell University (Ithaca, New York), Sep. 27, 2005.

\* cited by examiner

*Primary Examiner*—Khai Tran
(74) *Attorney, Agent, or Firm*—D. Kligler I.P. Services Ltd.

(57) ABSTRACT

A method for jointly designing a transmitter pulse-shaping filter and a receiver pulse-shaping filter having respective filter coefficients includes defining one or more performance-related variables based on at least some of the filter coefficients of the transmitter and receiver pulse-shaping filters. One or more constraints applicable to one or more of the filter coefficients and variables are set. A cost function defined over the variables is evaluated. Optimized filter coefficient values of the transmitter and receiver pulse-shaping filters are jointly calculated by applying an optimization process to the cost function while meeting the one or more constraints.

44 Claims, 4 Drawing Sheets

JOINT OPTIMIZATION OF TRANSMITTER AND RECEIVER PULSE-SHAPING FILTERS

FIELD OF THE INVENTION

The present invention relates generally to communication systems, and particularly to methods and tools for designing and optimizing transmitter and receiver pulse-shaping filters.

BACKGROUND OF THE INVENTION

Several methods are known in the art for designing transmitter and receiver pulse-shaping filters. Such methods are described, for example, by Zeng in "Pulse Shaping Filter Design and Interference Analysis in UWB Communication Systems," PhD Thesis submitted to the Virginia Polytechnic Institute and State University, Falls Church, Va., Jul. 20, 2005, which is incorporated herein by reference. Chapter 4, pages 62-80 describes a two-stage method in which the transmitter pulse-shaping filter of an ultra wideband (UWB) system is first designed to meet a given spectral mask. Based on the optimized transmitter filter, the receiver pulse-shaping filter is designed to suppress multiple-access interference and best recover the transmitted signal.

Mir and Roy describe a method for transmitter and receiver filter optimization in a digital subscriber line (DSL) system in "Optimum Transmitter/Receiver Design for a Narrowband Overlay in Noncoordinated Subscriber Lines," IEEE Transactions on Communications, (52:6), June 2004, pages 992-998, which is incorporated herein by reference. The optimization method attempts to reduce cross-talk interference between DSL systems occupying the same frequency band.

Another transmitter/receiver optimization method is described by Ho Cho in "Joint Transmitter and Receiver Optimization in Additive Cyclostationary Noise," IEEE Transactions on Information Theory, (50:12), December 2004, pages 3396-3405, which is incorporated herein by reference. The method considers strictly band-limited linear modulations in additive cyclostationary noise. Optimum transmitter and receiver waveforms that jointly minimize the mean-squared error at the output of the receiver are derived.

Jung and Wunder describe a mathematical framework for joint transmitter and receiver pulse shape optimization with respect to the scattering function of a wide-sense stationary uncorrelated scattering (WSSUS) channel in "The WSSUS Pulse Design Problem in Multicarrier Transmission," e-printed in arXiv.org operated by Cornell University (Ithaca, N.Y.), Sep. 27, 2005, which is incorporated herein by reference. This paper is also available at www.arxiv.org/abs/cs.IT/0509079.

SUMMARY OF THE INVENTION

Embodiments of the present invention provide improved methods for jointly designing transmitter and receiver pulse-shaping filters. Unlike some known filter design methods, the disclosed methods enable a system designer to trade off a wide variety of different performance characteristics and figures-of-merit of the transmitter and receiver when designing the filters. For example, allowing a certain amount of inter-symbol interference (ISI) by the filters often enables significant reduction in the peak-to-average ratio (PAR) of the transmitted signal. As will be demonstrated below, the design methods described herein enable the designer to define constraints to be met by the transmitter and/or receiver, such as a specified transmitter spectral mask. Other requirements may be relaxed in order to optimize the transmitter and receiver filters to suit a desired performance trade-off.

In a typical design process, the designer defines one or more performance-related variables formulated in terms of at least some of the coefficients of the transmitter and receiver pulse-shaping filters. Based on at least some of the filter coefficients and performance-related variables, the designer may set one or more optimization constraints. The designer defines a cost function over the variables. Optimized coefficient values of the transmitter and receiver pulse-shaping filters are then jointly calculated by applying an optimization process to the cost function while meeting the one or more constraints.

There is therefore provided, in accordance with an embodiment of the present invention, a method for jointly designing a transmitter pulse-shaping filter and a receiver pulse-shaping filter having respective filter coefficients, including:

defining one or more performance-related variables based on at least some of the filter coefficients of the transmitter and receiver pulse-shaping filters;

setting one or more constraints applicable to one or more of the filter coefficients and variables;

evaluating a cost function defined over the variables; and jointly calculating optimized filter coefficient values of the transmitter and receiver pulse-shaping filters by applying an optimization process to the cost function while meeting the one or more constraints.

In an embodiment, the one or more performance-related variables include a peak to average ratio (PAR) at an output of a transmitter including the transmitter pulse-shaping filter. In another embodiment, the one or more performance-related variables include an adjacent channel interference (ACI) at an output of the receiver pulse-shaping filter. Additionally or alternatively, the one or more performance-related variables may include a residual self inter-symbol interference (SISI) at the output of the receiver pulse-shaping filter. Further additionally or alternatively, the one or more performance-related variables may include a signal to noise ratio (SNR) degradation caused by a deviation from a matched filter response between the transmitter and receiver pulse-shaping filters.

In another embodiment, the one or more performance-related variables include a distance from a spectral mask defined for a transmitter including the transmitter pulse-shaping filter. In yet another embodiment, the one or more performance-related variables include a normalized mean square error (NMSE) caused by a non-linear noise floor in at least one of a transmitter including the transmitter pulse-shaping filter and a receiver including the receiver pulse-shaping filter.

In still another embodiment, the one or more performance-related variables include a symbol rate of a transmitter including the transmitter pulse-shaping filter and a receiver including the receiver pulse-shaping filter. Additionally or alternatively, the one or more performance-related variables include a variable indicative of hardware-related distortion in at least one of a transmitter including the transmitter pulse-shaping filter and a receiver including the receiver pulse-shaping filter.

In an embodiment, setting the one or more constraints includes at least one of setting respective limits on one or more of the variables and setting a limit on a function defined over the one or more of the variables. Additionally or alternatively, setting the one or more constraints includes defining a spectral mask to be met by a signal at an output of a transmitter including the transmitter pulse-shaping filter. Further additionally or alternatively, setting the one or more constraints includes defining an upper limit on a residual self inter-symbol interference (SISI) at the output of the receiver pulse-shaping filter. In another embodiment, setting the one or more constraints includes defining an upper limit on an adjacent channel interference (ACI) at an output of the receiver pulse-shaping filter. In yet another embodiment, setting the one or more constraints includes defining an upper limit on a peak to average ratio (PAR) at the output of a transmitter including the transmitter pulse-shaping filter. In still another embodiment, setting the one or more constraints includes defining an upper limit on a normalized mean square error (NMSE) caused by a non linear noise floor in at least one of a transmitter including the transmitter pulse-shaping filter and a receiver including the receiver pulse-shaping filter.

In a disclosed embodiment, jointly calculating the optimized filter coefficient values includes relaxing a requirement from a first performance-related variable imposed on the transmitter and receiver pulse-shaping filters while improving a performance of a second performance-related variable imposed on at least one of the transmitter and receiver pulse-shaping filters. The first performance-related variable may include a residual self inter-symbol interference (SISI) at the output of the receiver pulse-shaping filter, and the second performance-related variable may include a peak to average ratio (PAR) at an output of a transmitter including the transmitter pulse-shaping filter.

In an embodiment, applying the optimization process to the cost function includes minimizing a peak to average ratio (PAR) at an output of a transmitter including the transmitter pulse-shaping filter. Applying the optimization process to the cost function may include maximizing a symbol rate of a transmitter including the transmitter pulse-shaping filter and a receiver including the receiver pulse-shaping filter while meeting a spectral mask defined for the transmitter.

In another embodiment, jointly calculating the optimized filter coefficient values includes optimizing at least one of a tap configuration, a number of coefficients and a coefficient quantization of at least one of the transmitter and receiver pulse-shaping filters. Additionally or alternatively, jointly calculating the optimized filter coefficient values may include applying at least one of a gradient-based and an exhaustive search-based optimization method.

There is also provided, in accordance with an embodiment of the present invention, apparatus for jointly designing a transmitter pulse-shaping filter and a receiver pulse-shaping filter having respective filter coefficients, including:

a user interface, which is arranged to accept definitions of one or more performance-related variables based on at least some of the filter coefficients of the transmitter and receiver pulse-shaping filters, of one or more constraints applicable to one or more of the filter coefficients and variables, and of a cost function defined over the variables; and a processor, which is arranged to jointly calculate optimized filter coefficient values of the transmitter and receiver pulse-shaping filters by applying an optimization process to the cost function while meeting the one or more constraints.

There is additionally provided, in accordance with an embodiment of the present invention, a computer software product for jointly designing a transmitter pulse-shaping filter and a receiver pulse-shaping filter having respective filter coefficients, the product including a computer-readable medium, in which program instructions are stored, which instructions, when read by a computer, cause the computer to accept definitions of one or more performance-related variables based on at least some of the filter coefficients of the transmitter and receiver pulse-shaping filters, to accept definitions of one or more constraints applicable to one or more of the filter coefficients and variables, to accept a cost function defined over the variables, and to jointly calculate optimized filter coefficient values of the transmitter and receiver pulse-shaping filters by applying an optimization process to the cost function while meeting the one or more constraints.

There is further provided, in accordance with an embodiment of the present invention, a communication system, including:

a transmitter, which includes a transmitter pulse shaping filter; and a receiver, which includes a receiver pulse shaping filter, wherein the transmitter and receiver pulse shaping filters have respective filter coefficients, which are determined by defining one or more performance-related variables based on at least some of the filter coefficients of the transmitter and receiver pulse-shaping filters, setting one or more constraints applicable to one or more of the filter coefficients and variables, evaluating a cost function defined over the variables, and jointly optimizing the filter coefficient values of the transmitter and receiver pulse-shaping filters by applying an optimization process to the cost function while meeting the one or more constraints.

The present invention will be more fully understood from the following detailed description of the embodiments thereof, taken together with the drawings in which:

DETAILED DESCRIPTION OF EMBODIMENTS

System Description

Figure 1:
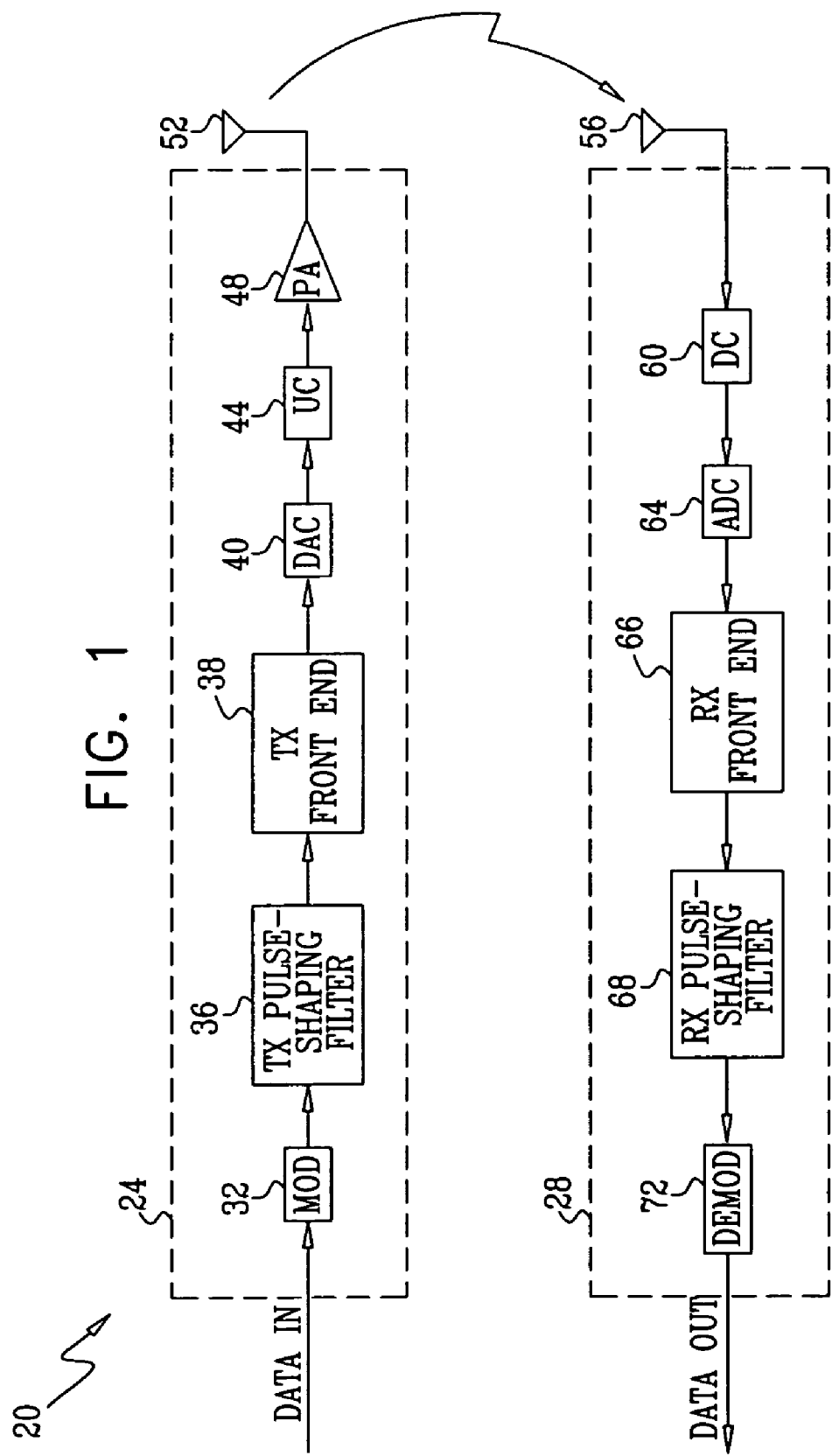
FIG. 1 is a block diagram that schematically illustrates a wireless communication system, in accordance with an embodiment of the present invention.

FIG. 1 is a block diagram that schematically illustrates a wireless communication system 20, in accordance with an embodiment of the present invention. System 20 comprises a transmitter 24, which accepts digital data, converts it to a modulated radio frequency (RF) signal and transmits the signal to a receiver 28. Receiver 28 receives the RF signal and demodulates it so as to reproduce the data.

The digital data provided to transmitter 24 is modulated by a modulator 32 to produce a sequence of modulated samples that represent symbols, in accordance with a certain modulation format. The modulated samples are filtered by a transmitter pulse-shaping filter 36 to produce a sequence of filtered samples. Filter 36 comprises a digital filter, which may be implemented as a finite impulse response (FIR) filter, an infinite impulse response (IIR) filter, or using any other suitable configuration known in the art. In some embodiments, a transmitter front end 38 processes the output of the transmitter pulse-shaping filter. Transmitter front end 38 may perform functions such as interpolation, predistortion and/or other filtering operations.

The filtered samples are provided to a digital-to-analog converter (DAC) 40, which produces an analog signal representing the modulated and filtered sample sequence at its input. The analog signal is then upconverted to a suitable radio frequency by an upconverter 44 and amplified by a power amplifier (PA) 48. The high power RF signal is transmitted via a transmit antenna 52.

A receive antenna 56 receives the transmitted signal and provides it to a downconverter 60, which downconverts the signal from RF to a suitable intermediate frequency (IF) or baseband analog signal. The analog signal is digitized by an analog-to-digital converter (ADC) 64, which produces a sequence of digitized samples. In some embodiments, the digitized samples are processed by a receiver front end 66, which performs functions such as decimation, automatic gain control (AGC) and/or other adaptive filtering operations. The samples are then filtered by a receiver pulse-shaping filter 68. Filter 68 comprises a digital filter, which may be implemented as a finite impulse response (FIR) filter, an infinite impulse response (IIR) filter, or using any other suitable configuration known in the art. The samples at the output of filter 68 are demodulated by a demodulator 72, which reproduces and outputs the data provided to transmitter 24.

The embodiments described below are mainly concerned with methods for jointly designing and optimizing pulse-shaping filters 36 and 68. The system configuration of FIG. 1 is a simplified configuration, chosen purely for the sake of conceptual clarity in order to show the functions of pulse shaping filters 36 and 68 in communication system 20. The design methods described herein can be used to produce transmitter and receiver pulse-shaping filters for use in any suitable communication system, such as microwave links and other point-to-point wireless links, cellular communication systems and satellite communication systems. The design methods described herein can also be used to produce transmitter and receiver pulse-shaping filters for use in wired communication systems such as cable modems and DSL systems.

The order of functional blocks in the transmitter and receiver shown in FIG. 1 is an exemplary order. In alternative embodiments, the functional blocks may be arranged and applied in any other suitable order.

Figure 2:
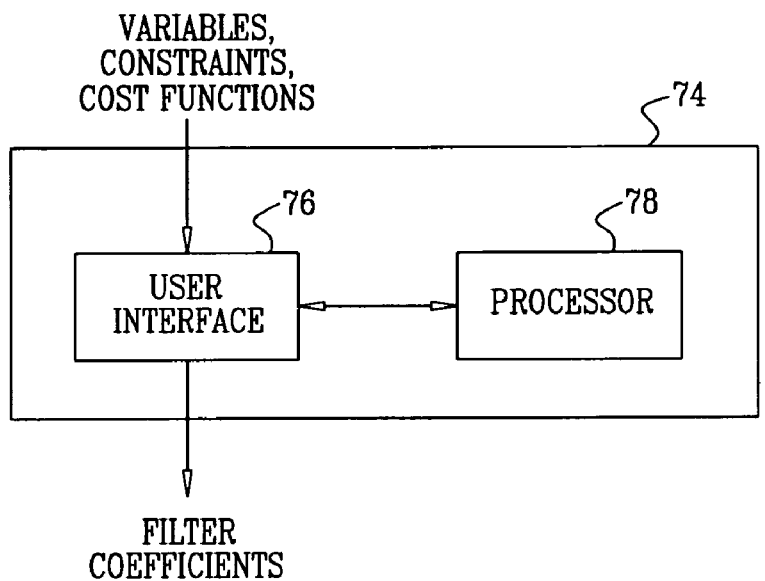
FIG. 2 is a block diagram that schematically illustrates a filter design tool, in accordance with an embodiment of the present invention.

FIG. 2 is a block diagram that schematically illustrates a filter design tool 74, in accordance with an embodiment of the present invention. Tool 74 comprises a user interface 76 for interacting with a user, such as a system designer. The designer inputs definitions such as implementation-specific parameters, variables, constraints and cost functions that define the desired optimization. Interface 76 may comprise any suitable interface for accepting the user definitions and for providing the optimization results, such as a suitable graphic user interface (GUI) or a file transfer interface. An optimization processor 78 accepts the user definitions and applies an optimization process, to produce optimized coefficient values of filters 36 and 68. The resulting filter coefficient values are provided to the designer via interface 76.

Typically, optimization processor 78 comprises a general-purpose computer, which is programmed in software to carry out the functions described herein. The software may be downloaded to the computer in electronic form, over a network, for example, or it may alternatively be supplied to the computer on tangible media, such as CD-ROM.

Joint Optimization of Transmitter and Receiver Pulse-Shaping Filters

The spectral responses of filters 36 and 68 often have significant influence on the performance of communication system 20. For example, filter 36 limits the spectral bandwidth of the transmitted signal, often determining the level of adjacent channel interference and other spurious emissions generated by transmitter 24. When transmitter 24 conforms to a particular communication standard, the bandwidth of the transmitted signal is typically specified in the standard, often using a spectral mask, which should not be exceeded. In some cases, filter 36 may increase the peak-to-average ratio of the transmitted signal, which may limit the output power of power amplifier 48 or cause non-linear distortion in the transmitted signal.

The filtering operation of filters 36 and 68 often introduces a certain amount of inter-symbol interference (ISI) into the filtered samples, which may degrade the performance of demodulator 72. The response of filter 68 may determine the selectivity of receiver 28, i.e., its ability to suppress out-of-band interference. Other effects of filters 36 and 68 on the performance of system 20 will be apparent to those skilled in the art.

In order to minimize ISI in the signal demodulated by demodulator 72, many known communication methods and systems implement filters 36 and 68 such that their combined spectral response produces a raised cosine (RC) spectral response. In many cases, the RC response is split equally between the transmitter and receiver filters, so that each of filters 36 and 68 has a root raised cosine (RRC) response. In such configurations, the transmitter and receiver pulse-shaping filters are matched to one another.

Although optimized for ISI minimization, the RC response, and in particular the splitting of this response into two RRC responses in the transmitter and receiver, may be non-optimal for other performance characteristics, such as transmitted signal peak-to-average ratio, adjacent channel interference and/or compliance with a particular spectral mask. In some practical cases, however, a different pulse-shaping filter design may relax the ISI requirement (i.e., introduce a tolerable amount of ISI) while enabling significant improvement in other performance characteristics.

Embodiments of the present invention provide design methods for jointly optimizing the transmitter and receiver pulse-shaping filters to specified performance characteristics and constraints. These methods provide greater flexibility to a system designer in determining the performance trade-offs of the system.

Figure 3:
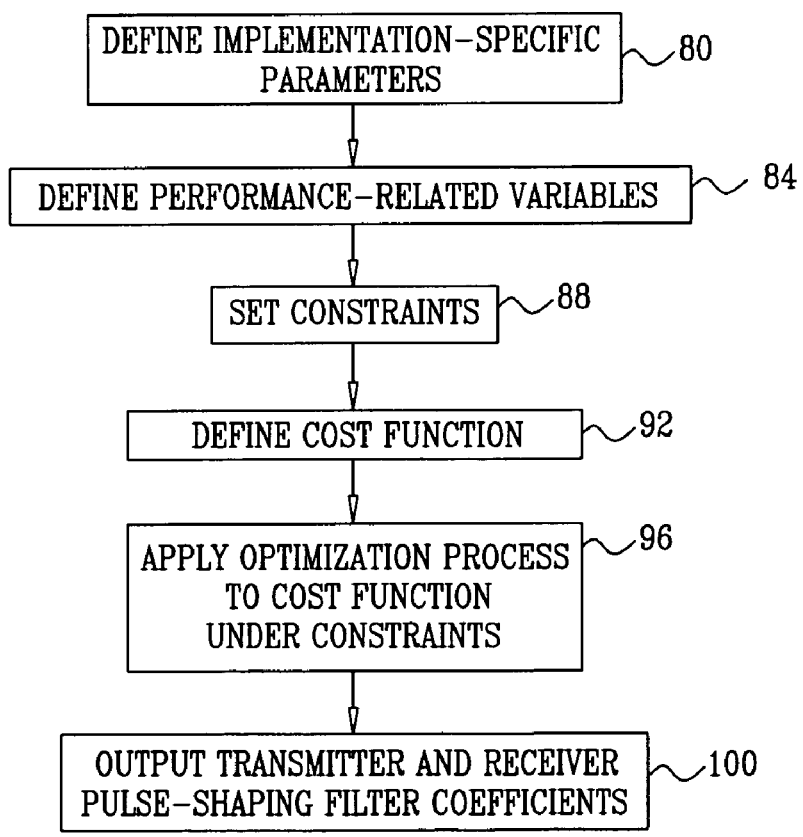
FIG. 3 is a flow chart that schematically illustrates a method for joint optimization of transmitter and receiver pulse-shaping filters, in accordance with an embodiment of the present invention.

FIG. 3 is a flow chart that schematically illustrates a method for joint optimization of transmitter and receiver pulse-shaping filters 36 and 68, in accordance with an embodiment of the present invention. Two optimization examples are shown in FIGS. 4A, 4B, 5A and 5B further below. In the description that follows, transmitter filter 36 comprises a FIR filter having n coefficients denoted g[1] . . . g[n]. Receiver filter 68 comprises a FIR filter having m coefficients denoted h[1] . . . h[m].

The method begins with a designer specifying implementation-specific parameters, at an implementation definition step 80. Implementation-specific parameters may comprise, for example, the configuration (FIR, IIR) of filters 36 and 68, the number of coefficients (taps) in each of the filters and the number of bits allocated to each filter coefficient (i.e., tap quantization). The designer provides the implementation-specific parameters to tool 74 using interface 76.

The designer then defines one or more performance-related variables, at a variable definition step 84. The variables typically comprise performance figures-of-merit of system 20, expressed in terms of the coefficients of filters 36 and 68. The designer provides the variables to tool 74 using interface 76.

For example, the designer may define a variable denoted Y1 expressing the peak-to-average ratio (PAR) of the signal produced by transmitter pulse-shaping filter 36:

$$Y1 = \frac{\left(\sum_{i=1}^{n} |g[i]|\right)^2}{\frac{1}{N} \cdot \sum_{i=1}^{n} |g[i]|^2} \quad [1]$$

wherein N denotes the samples per symbol ratio of filter 36 (i.e., the number of samples used to express each symbol in the response g[1] . . . g[n]). In some cases, when the transmitted signal is represented using N samples per symbol, the maximum PAR value should be selected at a particular sampling offset. In such cases, Y1 can be expressed as $$Y1 = \frac{\max_{0 < k < N-1}\left[\sum_{i} |g(N \cdot i + k)|^2\right]}{\frac{1}{N} \cdot \sum_{i=1}^{n} |g[i]|^2} \quad [2]$$

Equation [2] chooses the sampling time offset (denoted k) that provides the maximum PAR value.

As another example, the designer may define a variable denoted Y2, which specifies the amount of adjacent channel interference (ACI) in the receiver. Let G=DTFT(g) and H=DTFT(h) denote the Discrete-Time Fourier Transform (DTFT), or frequency-domain transfer functions, of filters 36 and 68, respectively. The lengths of the two DTFTs are assumed to be the same. If the two filters are not the same length, one of them can be zero padded to fulfill this condition. Let T1 denote the combined frequency-domain transfer function of filters 36 and 68, when the transmitter frequency is set to the adjacent channel. T1 can be written as T1=H(f)·G(f−ΔCH), (assuming the Nyquist frequency used is sufficiently high to avoid aliasing in G(f−ΔCH)). ΔCH denotes the adjacent channel spacing, or the frequency offset between two adjacent systems. Let T2 denote a system frequency-domain transfer function used as a reference. T2 is given by T2=H(f)·G(f). The adjacent channel interference can be written as $$Y2 = 10 \log_{10}\left[\frac{\sum_{k} |T1[k]|^2}{\sum_{k} |T2[k]|^2}\right] \quad [3]$$

wherein k sums over the frequency bins of a suitable frequency range that covers both T1 and T2. Although equation [2] does not explicitly show the dependence of Y2 on the time-domain filter coefficient values g[ ] and h[ ], Y2 does depend on these values according to the definitions of T1, T2, G and H.

As yet another example, the designer may specify a variable denoted Y3, which defines the residual ISI in the received signal. Let SISI denote the mean square error due to ISI, or self ISI, in the received signal. The normalized Self ISI is given by $$SISI = \quad [4]$$

-continued
$$\frac{E(z_k - x_k)^2}{E(x_k)^2} = \sum_{n \neq ctrcoeff} |L[n \cdot N]|^2 + |1 - ctrcoeff|^2 + \sum_{n} |s[n \cdot N]|^2$$

wherein $x_k$ denotes a symbol and $z_k$ denotes a received sample. The signal is assumed to be synchronized, i.e., sampled at the correct timing. L[n] denotes a convolution of the two pulse-shaping filters, i.e., $$L[n] = g * h = \sum_{k} g[k]h[n-k].$$

ctrcoeff denotes the value of the center coefficient of L[n]. The term $$\sum_{n \neq ctrcoeff} L[n]$$

in equation [4] above excludes the center coefficient, and the samples of L[·] should be chosen at the correct sampling instant which minimizes ISI. s[n] is defined as $$s[n] = \sum_{k} g[k] e^{-j\Pi k} h^*[n-k].$$

The term S[n] accounts for aliasing effects encountered when the receiver uses direct IF sampling, as is known in the art. When the receiver uses other downconversion methods, this term can be omitted.

As another example, the designer may define a variable denoted Y4, which specifies the degradation in signal to noise ratio (SNR) caused when filter 68 (response h) deviates from an optimal matched filter for the transmitted signal produced by filter 36 (response g). The optimal SNR can be written as $$SNR_{opt} = \frac{\sum_{k} |g[k]|^2}{N_0} \quad [5]$$

wherein $N_0$ denotes the noise power at the output of filter 68. The SNR degradation variable is given by $$Y4 = \frac{SNR}{SNR_{opt}} = \frac{\left|\sum_{k} g[k] h^*[-k]\right|^2}{\sum_{k} |g[k]|^2 \sum_{k} |h[k]|^2} \quad [6]$$

In some embodiments, variables can be defined for quantifying certain hardware-related distortion mechanisms. For example, if a non-linear model of PA 48 is available, the designer can define a variable specifying the non-linear distortion generated by the PA.

Additionally or alternatively, the designer may define any other suitable variable that specifies a performance figure-ofmerit of system 20 in terms of coefficients g[1] ... g[n] and h[1] ... h[m] of filters 36 and 68. Such variables may comprise, for example, the system symbol rate (baud rate), the distance from a spectral mask defined for the transmitted signal and the normalized mean square error (NMSE) caused by a non-linear noise floor (e.g. a non-linear noise floor caused by the transmitter power amplifier).

The designer then sets one or more constraints, at a constraint definition step 88. Constraints are typically derived from requirements in the system specification or requirements imposed by applicable communication standards or regulations. For example, a constraint may define a regulatory spectral mask that should be met by the transmitted signal. Other exemplary constraints may require that the residual ISI (Y3) and/or ACI (Y2) be smaller than certain predetermined values. In general, constraints may depend on the variables defined in step 84 above, on the coefficients of filters 36 and 68, or both. The constraints are provided to tool 74 via interface 76.

The designer defines a cost function, at a cost definition step 92. The cost function, denoted COST, is defined over one or more of the variables specified in step 84 above and defines the desired joint optimization of filters 36 and 68. For example, COST=MIN(Y2) defines that the coefficients of filters 36 and 68 are to be optimized for minimum ACI. COST=MIN(Y1) defines that the filters are to be optimized for minimum peak-to-average ratio of the transmitted signal. The cost function may be defined over several variables. For example, COST=MIN{f(Y1,Y2)} defines that the filter coefficients should be optimized for a function of both peak-to-average ratio and minimum ACI. The function f defines the relative weight, or significance, given to each of the variables in the optimization process. The designer provides the cost function to tool 74 using interface 76.

Optimization processor 78 performs an optimization process to determine the optimized filter coefficients, at an optimization step 96. The processor jointly determines the values of coefficients g[1] ... g[n] and h[1] ... h[m] of filters 36 and 68, respectively, which optimize the cost function COST under the defined constraints. Processor 78 may use any suitable optimization method known in the art for this purpose, such as various gradient methods, various exhaustive search and other search methods that explore the space of coefficient values.

For example, in some embodiments, processor 78 uses the Optimization Toolbox of the MATLAB® computational software tool produced by The Mathworks, Inc. (Natick, Mass.) for performing the optimization process. Specifically, processor 78 may use the fmincon optimization function defined in the optimization toolbox. The fmincon function finds a minimum of a constrained non-linear multivariable function. Documentation of this optimization function can be found at www.mathworks.com/access/helpdesk/help/toolbox/optim/ug/fmincon.html. Information regarding the optimization toolbox can be found at www.mathworks.com/access/helpdesk/help/toolbox/optim/ug/index.html.

Processor 78 outputs the optimized coefficient values via interface 76, at an output step 100, and the method terminates. In some embodiments, the optimization process may optimize some or all of the implementation-specific parameters, as well. For example, the coefficient quantization and/or the length (i.e., number of coefficients) of one or both pulse-shaping filters can be optimized.

Exemplary Optimization Results

FIGS. 4A, 4B, 5A and 5B are graphs that show frequency-domain responses of jointly-optimized transmitter and receiver pulse-shaping filters, in accordance with an embodiment of the present invention.

In order to evaluate the effectiveness of the optimization method of FIG. 3 above, pulse-shaping filters optimized using the disclosed method were compared with RRC filters having the same implementation-specific parameters (i.e., same number of coefficients and quantization). In the examples that follow, both the reference (RRC-based) and the optimized communication system use 16-signal Quadrature amplitude (16-QAM) modulation. The transmitter pulse-shaping filter comprises a 65 coefficient FIR filter. The receiver pulse-shaping filter comprises a 33 coefficient FIR filter. The coefficients of both filters are quantized non-uniformly using a rounding function. The center coefficients of both filters are represented using 12 bits. The quantization level gradually decreases, with edge coefficients represented using 4 bits. The adjacent channel spacing ($\Delta$CH) is 14 MHz. (As noted above, the symbol rate may also be defined as a variable or as a cost function.) In the reference system, both transmitter and receiver RRC filters have a roll-off factor of 0.25.

Figure 4A:
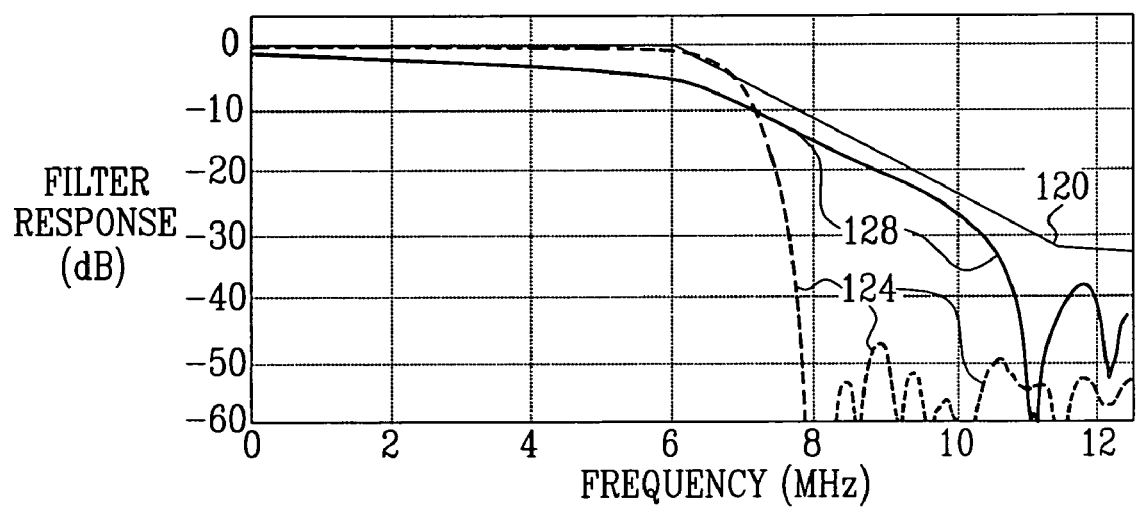
FIGS. 4A, 4B, 5A and 5B are graphs that show frequency-domain responses of jointly-optimized transmitter and receiver pulse-shaping filters, in accordance with an embodiment of the present invention.
Figure 4B:
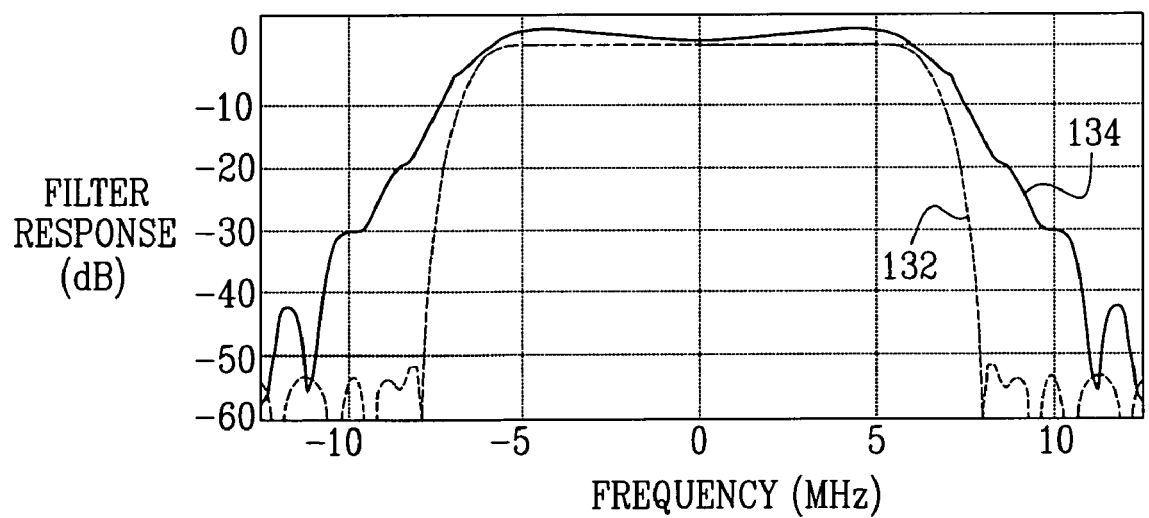

FIG. 4A shows a comparison between the optimized and RRC transmitter pulse-shaping filters. The corresponding comparison between the receiver pulse-shaping filters is shown in FIG. 4B below. The transmitter and receiver pulse-shaping filters were jointly optimized using the method of FIG. 3 above. In FIG. 4A, a curve 120 shows a spectral mask defined for the transmitted signal. In the present example, curve 120 shows the spectral mask defined in the European Telecommunications Standards Institute (ETSI) EN 302 217-2-2 standard entitled "Fixed Radio Systems; Characteristics and Requirements for Point-to-Point Equipment and Antennas." This standard is available at www.etsi.org.

A curve 124 shows the spectral response of the reference RRC pulse-shaping filter. A curve 128 shows the spectral response of an optimized transmitter pulse-shaping filter. In FIG. 4B, a curve 132 shows the spectral response of the reference RRC receiver pulse-shaping filter. A curve 134 shows the spectral response of the optimized receiver pulse-shaping filter.

The optimization that produced the optimized transmitter and receiver filters of curves 128 and 134, respectively, attempted to minimize the peak-to-average ratio of the transmitted signals (variable Y1 as defined in equation [1] above). The constraints defined in the optimization were (1) self ISI (Y3)$\leq$−38 dB, (2) SNR degradation (Y4)$\leq$0.2 dB, (3) ACI (Y2)$\leq$−17 dB and (4) compliance with the spectral mask of curve 120.

The symbol rate used in both reference and optimized systems is 12.5 MHz. As can be seen in FIG. 4A, curve 124 violates the mask of curve 120 by approximately 1.5 dB at this symbol rate. Although the example shows a RRC filter having a rolloff factor of 0.25, it was not possible to reach a symbol rate of 12.5 MHz using an RRC transmitter filter while meeting the spectral mask. Curve 128, however, shows that the optimized transmitter filter does meet the spectral mask constraint at a symbol rate of 12.5 MHz.

The following table shows a comparison between the figures-of-merit of the reference and optimized systems, following completion of the optimization process:

| Parameter | Peak-to-average ratio (Y1) | ACI (Y2) | Residual ISI (Y3) | SNR degradation (Y4) |
| --- | --- | --- | --- | --- |
| Reference system | 5.4 dB | −29.6 dB | −45.4 dB | 0.02 dB |
| Constraint | — | ≦−17.0 dB | ≦−38 dB | ≦0.2 dB |
| Optimized system | 2.5 dB | −17.0 dB | −39.7 dB | 0.2 dB |

As can be seen from the table, the optimization significantly reduced signal peak-to-average ratio of the transmitted signal from 5.4 to 2.5 dB, while meeting the defined constraints. This example shows that a pair of jointly-designed transmitter and receiver pulse-shaping filters allowing a certain amount of signal distortion enables significant peak-to-average ratio reduction. These filters also enable achieving a higher symbol rate, which in turn enables better performance due to reduced coding rate.

Figure 5A:
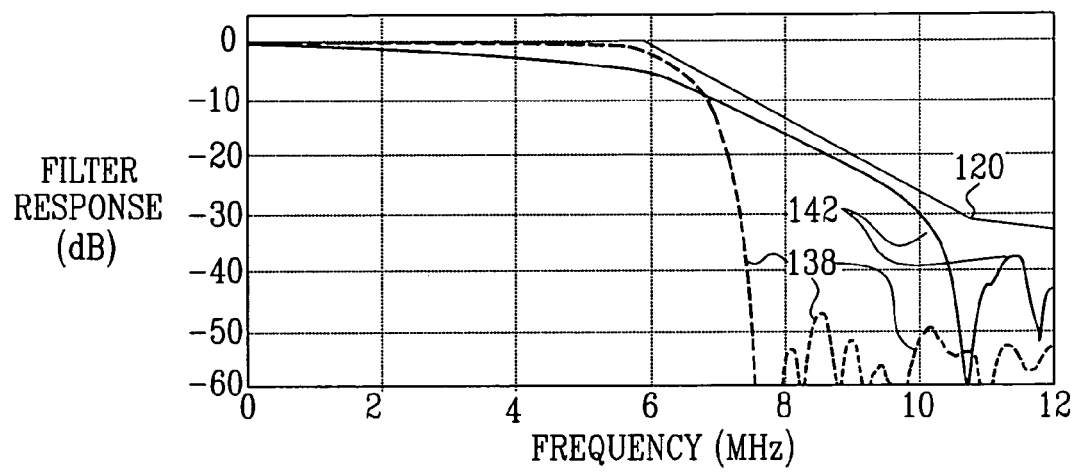
Figure 5B:
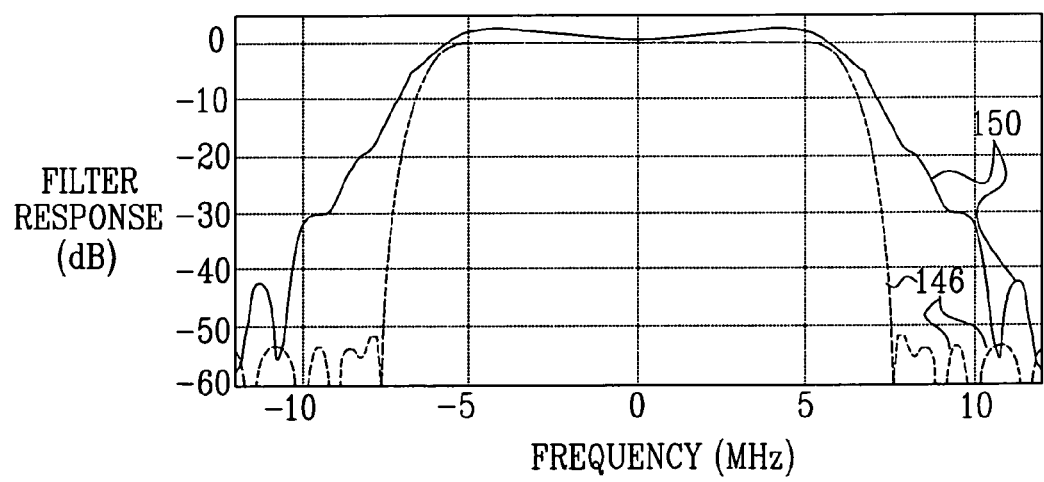

FIGS. 5A and 5B show a similar comparison at a slightly lower symbol rate of 12 MHz. FIG. 5A shows a comparison of transmitter pulse-shaping filters. A curve 138 shows the spectral response of the reference RRC transmitter filter. A curve 142 shows the spectral response of the optimized transmitter filter. At a symbol rate of 12 MHz, the RRC transmitter filter complies with the spectral mask of curve 120. FIG. 5B shows the corresponding comparison of receiver pulse-shaping filters. A curve 146 shows the spectral response of the reference RRC receiver filter. A curve 150 shows the spectral response of the optimized receiver filter.

The following table shows the figure-of-merit comparison between the reference and optimized systems at a symbol rate of 12 MHz:

| Parameter | Peak-to-average ratio (Y1) | ACI (Y2) | Residual ISI (Y3) | SNR degradation (Y4) |
| --- | --- | --- | --- | --- |
| Reference system | 5.4 dB | −43.3 dB | −45.4 dB | 0.02 dB |
| Constraint | — | ≦−17.0 dB | ≦−38 dB | ≦0.2 dB |
| Optimized system | 2.5 dB | −20.1 dB | −39.7 dB | 0.2 dB |

It can be seen that the optimization process reduced the peak-to-average ratio of the transmitted signal from 5.4 to 2.5 dB while meeting the defined constraints.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for jointly designing a transmitter pulse-shaping filter and a receiver pulse-shaping filter having respective filter coefficients, comprising:

defining one or more performance-related variables based on at least some of the filter coefficients of the transmitter and receiver pulse-shaping filters;

setting one or more constraints applicable to one or more of the filter coefficients and variables;

evaluating a cost function defined over the variables; and jointly calculating optimized filter coefficient values of the transmitter and receiver pulse-shaping filters by applying an optimization process to the cost function while meeting the one or more constraints wherein the one or more performance-related variables comprise at least one variable type selected from a group of types consisting of a peak to average ratio (PAR) at an output of a transmitter comprising the transmitter pulse-shaping filter, an adjacent channel interference (ACI) at an output of the receiver pulse-shaping filter, a residual self inter-symbol interference (SISI) at the output of the receiver pulse-shaping filter, a signal to noise ratio (SNR) degradation caused by a deviation from a matched filter response between the transmitter and receiver pulse-shaping filters, a distance from a spectral mask defined for the transmitter comprising the transmitter pulse-shaping filter, a normalized mean square error (NMSE) caused by a nonlinear noise floor in at least one of the transmitter comprising the transmitter pulse-shaping filter and a receiver comprising the receiver pulse-shaping filter, a symbol rate of the transmitter comprising the transmitter pulse-shaping filter and the receiver comprising the receiver pulse-shaping filter, and a variable indicative of hardware-related distortion in at least one of the transmitter comprising the transmitter pulse-shaping filter and the receiver comprising the receiver pulse-shaping filter.

2. The method according to claim 1, wherein the one or more performance-related variables comprise the peak to average ratio (PAR) at the output of the transmitter.

3. The method according to claim 1, wherein the one or more performance-related variables comprise the adjacent channel interference (ACI) at the output of the receiver pulse-shaping filter.

4. The method according to claim 1, wherein the one or more performance-related variables comprise the residual self inter-symbol interference (SISI) at the output of the receiver pulse-shaping filter.

5. The method according to claim 1, wherein the one or more performance-related variables comprise the signal to noise ratio (SNR) degradation.

6. The method according to claim 1, wherein the one or more performance-related variables comprise the distance from the spectral mask defined for the transmitter comprising the transmitter pulse-shaping filter.

7. The method according to claim 1, wherein the one or more performance-related variables comprise the normalized mean square error (NMSE) caused by the nonlinear noise floor.

8. The method according to claim 1, wherein the one or more performance-related variables comprise the symbol rate of the transmitter comprising the transmitter pulse-shaping filter and the receiver comprising the receiver pulse-shaping filter.

9. The method according to claim 1, wherein the one or more performance-related variables comprise the variable indicative of the hardware-related distortion.

10. The method according to claim 1, wherein jointly calculating the optimized filter coefficient values comprises relaxing a requirement from a first performance-related variable imposed on the transmitter and receiver pulse-shaping filters while improving a performance of a second performance-related variable imposed on at least one of the transmitter and receiver pulse-shaping filters.

11. The method according to claim 10, wherein the first performance-related variable comprises the residual self inter-symbol interference (SISI) at the output of the receiver pulse-shaping filter, and wherein the second performance-related variable comprises the peak to average ratio (PAR) at the output of the transmitter comprising the transmitter pulse-shaping filter.

12. The method according to claim 1, wherein applying the optimization process to the cost function comprises minimizing the peak to average ratio (PAR) at the output of the transmitter comprising the transmitter pulse-shaping filter.

13. The method according to claim 1, wherein applying the optimization process to the cost function comprises maximizing the symbol rate of the transmitter comprising the transmitter pulse-shaping filter and the receiver comprising the receiver pulse-shaping filter while meeting the spectral mask defined for the transmitter.

14. The method according to claim 1, wherein jointly calculating the optimized filter coefficient values comprises optimizing at least one of a tap configuration, a number of coefficients and a coefficient quantization of at least one of the transmitter and receiver pulse-shaping filters.

15. The method according to claim 1, wherein jointly calculating the optimized filter coefficient values comprises applying at least one of a gradient-based and an exhaustive search-based optimization method.

16. A method for jointly designing a transmitter pulse-shaping filter and a receiver pulse-shaping filter having respective filter coefficients, comprising:
defining one or more performance-related variables based on at least some of the filter coefficients of the transmitter and receiver pulse-shaping filters;
setting one or more constraints applicable to one or more of the filter coefficients and variables;
evaluating a cost function defined over the variables; and
jointly calculating optimized filter coefficient values of the transmitter and receiver pulse-shaping filters by applying an optimization process to the cost function while meeting the one or more constraints,
wherein setting the one or more constraints comprises performing at least one action selected from a group of actions consisting of setting respective limits on one or more of the variables, setting a limit on a function defined over the one or more of the variables, defining a spectral mask to be met by a signal at an output of a transmitter comprising the transmitter pulse-shaping filter, defining an upper limit on a residual self inter-symbol interference (SISI) at an output of the receiver pulse-shaping filter, defining the upper limit on an adjacent channel interference (ACI) at the output of the receiver pulse-shaping filter, defining the upper limit on a peak to average ratio (PAR) at the output of the transmitter comprising the transmitter pulse-shaping filter, and defining the upper limit on a normalized mean square error (NMSE) caused by a non linear noise floor in at least one of the transmitter comprising the transmitter pulse-shaping filter and the receiver comprising the receiver pulse-shaping filter.

17. The method according to claim 16, wherein setting the one or more constraints comprises defining the spectral mask to be met by the signal at the output of the transmitter comprising the transmitter pulse-shaping filter.

18. The method according to claim 16, wherein setting the one or more constraints comprises defining the upper limit on the residual self inter-symbol interference (SISI) at the output of the receiver pulse-shaping filter.

19. The method according to claim 16, wherein setting the one or more constraints comprises defining the upper limit on the adjacent channel interference (ACI) at the output of the receiver pulse-shaping filter.

20. The method according to claim 16, wherein setting the one or more constraints comprises defining the upper limit on the peak to average ratio (PAR) at the output of the transmitter comprising the transmitter pulse-shaping filter.

21. The method according to claim 16, wherein setting the one or more constraints comprises defining the upper limit on the normalized mean square error (NMSE) caused by the non linear noise floor.

22. Apparatus for jointly designing a transmitter pulse-shaping filter and a receiver pulse-shaping filter having respective filter coefficients, comprising:
a user interface, which is arranged to accept definitions of one or more performance-related variables based on at least some of the filter coefficients of the transmitter and receiver pulse-shaping filters, of one or more constraints applicable to one or more of the filter coefficients and variables, and of a cost function defined over the variables; and
a processor, which is arranged to jointly calculate optimized filter coefficient values of the transmitter and receiver pulse-shaping filters by applying an optimization process to the cost function while meeting the one or more constraints,
wherein the one or more performance-related variables comprise at least one variable type selected from a group of types consisting of a peak to average ratio (PAR) at an output of a transmitter comprising the transmitter pulse-shaping filter, an adjacent channel interference (ACI) at an output of the receiver pulse-shaping filter, a residual self inter-symbol interference (SISI) at the output of the receiver pulse-shaping filter, a signal to noise ratio (SNR) degradation caused by a deviation from a matched filter response between the transmitter and receiver pulse-shaping filters, a distance from a spectral mask defined for the transmitter comprising the transmitter pulse-shaping filter, a normalized mean square error (NMSE) caused by a non-linear noise floor in at least one of the transmitter comprising the transmitter pulse-shaping filter and a receiver comprising the receiver pulse-shaping filter, a symbol rate of the transmitter comprising the transmitter pulse-shaping filter and the receiver comprising the receiver pulse-shaping filter, and a variable indicative of hardware-related distortion in at least one of the transmitter comprising the transmitter pulse-shaping filter and the receiver comprising the receiver pulse-shaping filter.

23. The apparatus according to claim 22, wherein the one or more performance-related variables comprises the peak to average ratio (PAR) at the output of the transmitter comprising the transmitter pulse-shaping filter.

24. The apparatus according to claim 22, wherein the one or more performance-related variables comprise the adjacent channel interference (ACI) at the output of the receiver pulse-shaping filter.

25. The apparatus according to claim 22, wherein the one or more performance-related variables comprise the residual self inter-symbol interference (SISI) at the output of the receiver pulse-shaping filter.

26. The apparatus according to claim 22, wherein the one or more performance-related variables comprise the signal to noise ratio (SNR) degradation caused by the deviation from the matched filter response between the transmitter and receiver pulse-shaping filters.

27. The apparatus according to claim 22, wherein the one or more performance-related variables comprise the distance from the spectral mask defined for the transmitter comprising the transmitter pulse-shaping filter.

28. The apparatus according to claim 22, wherein the one or more performance-related variables comprise the normalized mean square error (NMSE) caused by the non-linear noise floor.

29. The apparatus according to claim 22, wherein the one or more performance-related variables comprise the symbol rate of the transmitter comprising the transmitter pulse-shaping filter and the receiver comprising the receiver pulse-shaping filter.

30. The apparatus according to claim 22, wherein the one or more performance-related variables comprise the variable indicative of the hardware-related distortion.

31. The apparatus according to claim 22, wherein the one or more constraints comprises the spectral mask to be met by the signal at the output of the transmitter comprising the transmitter pulse-shaping filter.

32. The apparatus according to claim 22, wherein the one or more constraints comprises the upper limit on the residual self inter-symbol interference (SISI) at the output of the receiver pulse-shaping filter.

33. The apparatus according to claim 22, wherein the one or more constraints comprises the upper limit on the adjacent channel interference (ACI) at the output of the receiver pulse-shaping filter.

34. The apparatus according to claim 22, wherein the one or more constraints comprises the upper limit on the peak to average ratio (PAR) at the output of the transmitter comprising the transmitter pulse-shaping filter.

35. The apparatus according to claim 22, wherein the one or more constraints comprises the upper limit on the normalized mean square error (NMSE) caused by the non linear noise floor.

36. The apparatus according to claim 22, wherein the processor is arranged to relax a requirement from a first performance-related variable imposed on the transmitter and receiver pulse-shaping filters while improving a performance of a second performance-related variable imposed on at least one of the transmitter and receiver pulse-shaping filters.

37. The apparatus according to claim 36, wherein the first performance-related variable comprises the residual self inter-symbol interference (SISI) at the output of the receiver pulse-shaping filter, and wherein the second performance-related variable comprises the peak to average ratio (PAR) at the output of the transmitter comprising the transmitter pulse-shaping filter.

38. The apparatus according to claim 22, wherein the processor is arranged to apply the optimization process to the cost function so as to minimize the peak to average ratio (PAR) at the output of the transmitter comprising the transmitter pulse-shaping filter while meeting the spectral mask defined for the transmitter.

39. The apparatus according to claim 22, wherein the processor is arranged to apply the optimization process to the cost function so as to maximize the symbol rate of the transmitter comprising the transmitter pulse-shaping filter and the receiver comprising the receiver pulse-shaping filter while meeting the spectral mask defined for the transmitter.

40. The apparatus according to claim 22, wherein the processor is arranged to optimize at least one of a tap configuration, a number of coefficients and a coefficient quantization of at least one of the transmitter and receiver pulse-shaping filters.

41. The apparatus according to claim 22, wherein the processor is arranged to jointly calculate the optimized filter coefficient values by applying at least one of a gradient-based and an exhaustive search-based optimization method.

42. Apparatus for jointly designing a transmitter pulse-shaping filter and a receiver pulse-shaping filter having respective filter coefficients, comprising:
 a user interface, which is arranged to accept definitions of one or more performance-related variables based on at least some of the filter coefficients of the transmitter and receiver pulse-shaping filters, of one or more constraints applicable to one or more of the filter coefficients and variables, and of a cost function defined over the variables; and
 a processor, which is arranged to jointly calculate optimized filter coefficient values of the transmitter and receiver pulse-shaping filters by applying an optimization process to the cost function while meeting the one or more constraints,
 wherein the one or more constraints comprise at least one constraint type selected from a group of types consisting of respective limits set on one or more of the variables, a limit set on a function defined over the one or more of the variables, a spectral mask to be met by a signal at an output of a transmitter comprising the transmitter pulse-shaping filter, an upper limit on a residual self inter-symbol interference (SISI) at the output of the receiver pulse-shaping filter, the upper limit on an adjacent channel interference (ACI) at an output of the receiver pulse-shaping filter, the upper limit on a peak to average ratio (PAR) at the output of the transmitter comprising the transmitter pulse-shaping filter, and the upper limit on a normalized mean square error (NMSE) caused by a non linear noise floor in at least one of the transmitter comprising the transmitter pulse-shaping filter and the receiver comprising the receiver pulse-shaping filter.

43. A computer software product for jointly designing a transmitter pulse-shaping filter and a receiver pulse-shaping filter having respective filter coefficients, the product comprising a computer-readable medium, in which program instructions are stored, which instructions, when read by a computer, cause the computer to accept definitions of one or more performance-related variables based on at least some of the filter coefficients of the transmitter and receiver pulse-shaping filters, to accept definitions of one or more constraints applicable to one or more of the filter coefficients and variables, to accept a cost function defined over the variables, and to jointly calculate optimized filter coefficient values of the transmitter and receiver pulse-shaping filters by applying an optimization process to the cost function while meeting the one or more constraints, wherein the one or more performance-related variables comprise at least one variable type selected from a group of types consisting of a peak to average ratio (PAR) at an output of a transmitter comprising the transmitter pulse-shaping filter, an adjacent channel interference (ACI) at an output of the receiver pulse-shaping filter, a residual self inter-symbol interference (SISI) at the output of the receiver pulse-shaping filter, a signal to noise ratio (SNR) degradation caused by a deviation from a matched filter response between the transmitter and receiver pulse-shaping filters, a distance from a spectral mask defined for the transmitter comprising the transmitter pulse-shaping filter, a normalized mean square error (NMSE) caused by a nonlinear noise floor in at least one of the transmitter comprising the transmitter pulse-shaping filter and a receiver comprising the receiver pulse-shaping filter, a symbol rate of the transmitter comprising the transmitter pulse-shaping filter and the receiver comprising the receiver pulse-shaping filter, and a variable indicative of hardware-related distortion in at least one of the transmitter comprising the transmitter pulse-shaping filter and the receiver comprising the receiver pulse-shaping filter.

44. A communication system, comprising:
a transmitter, which comprises a transmitter pulse shaping filter; and
a receiver, which comprises a receiver pulse shaping filter,
wherein the transmitter and receiver pulse shaping filters have respective filter coefficients, which are determined by defining one or more performance-related variables based on at least some of the filter coefficients of the transmitter and receiver pulse-shaping filters, setting one or more constraints applicable to one or more of the filter coefficients and variables, evaluating a cost function defined over the variables, and jointly optimizing the filter coefficient values of the transmitter and receiver pulse-shaping filters by applying an optimization process to the cost function while meeting the one or more constraints, and wherein the one or more performance-related variables comp rise at least one variable type selected from a group of types consisting of a peak to average ratio (PAR) at an output of a transmitter comprising the transmitter pulse-shaping filter, an adjacent channel interference (ACI) at an output of the receiver pulse-shaping filter, a residual self inter-symbol interference (SISI) at the output of the receiver pulse-shaping filter, a signal to noise ratio (SNR) degradation caused by a deviation from a matched filter response between the transmitter and receiver pulse-shaping filters, a distance from a spectral mask defined for the transmitter comprising the transmitter pulse-shaping filter, a normalized mean square error (NMSE) caused by a nonlinear noise floor in at least one of the transmitter comprising the transmitter pulse-shaping filter and a receiver comprising the receiver pulse-shaping filter, a symbol rate of the transmitter comprising the transmitter pulse-shaping filter and the receiver comprising the receiver pulse-shaping filter, and a variable indicative of hardware-related distortion in at least one of the transmitter comprising the transmitter pulse-shaping filter and the receiver comprising the receiver pulse-shaping filter.

\* \* \* \* \*